:((12) United States Patent
Wellborn et al.

(10) Patent No.: US 10,254,761 B2
(45) Date of Patent: Apr. 9, 2019

(54) VEHICLE BEVERAGE SPILL METHOD AND SYSTEM

(71) Applicant: GM GLOBAL TECHNOLOGY OPERATIONS LLC, Detroit, MI (US)

(72) Inventors: Carl W. Wellborn, Detroit, MI (US); Mary E. Decaluwe, Oxford, MI (US); Jim K. Rainbolt, Haslett, MI (US); Ki Hyun Ahn, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 15/620,475

(22) Filed: Jun. 12, 2017

(65) Prior Publication Data

US 2018/0356827 A1 Dec. 13, 2018

(51) Int. Cl.
*G01C 21/36* (2006.01)
*G05D 1/02* (2006.01)
*G06Q 30/06* (2012.01)
*G05D 1/00* (2006.01)

(52) U.S. Cl.
CPC ....... *G05D 1/0212* (2013.01); *G01C 21/3676* (2013.01); *G01C 21/3697* (2013.01); *G06Q 30/0633* (2013.01); *G06Q 30/0639* (2013.01); *G05D 1/0088* (2013.01); *G05D 2201/0212* (2013.01)

(58) Field of Classification Search
CPC ......... G05D 1/0212; G05D 2201/0212; G05D 1/0088; G06Q 30/0639; G06Q 30/0633; G01C 21/3676; G01C 21/3697
See application file for complete search history.

(56) References Cited

U.S. PATENT DOCUMENTS

| | | | |
|---|---|---|---|
| 2014/0087888 A1* | 3/2014 | Chudek | G07F 17/3202 463/46 |
| 2016/0092965 A1* | 3/2016 | Balar | G06Q 30/0633 705/15 |
| 2018/0074495 A1* | 3/2018 | Myers | B60W 40/08 |
| 2018/0075565 A1* | 3/2018 | Myers | G05D 1/0088 |
| 2018/0234707 A1* | 8/2018 | Pujia | H04N 21/2146 |

* cited by examiner

*Primary Examiner* — Alan D Hutchinson
(74) *Attorney, Agent, or Firm* — Lorenz & Kopf, LLP

(57) ABSTRACT

Methods and systems are provided for taking action when a beverage spill has occurred within a vehicle. In one example, the vehicle includes one or more sensors, an input device, and a processor. The one or more sensors are configured to detect that a beverage has spilled within a vehicle. The input device configured to receipt an in input from a passenger of the vehicle. The processor is coupled to the one or more sensors and to the input device, and configured to at least facilitate: providing information to a passenger of the vehicle as to an option to obtain a replacement beverage; receiving input from the passenger via the input device, in response to the information provided to the passenger, as to whether a replacement beverage is desired; and taking an action to obtain the replacement beverage, when the passenger has provided the input to obtain the replacement beverage.

20 Claims, 3 Drawing Sheets

VEHICLE BEVERAGE SPILL METHOD AND SYSTEM

TECHNICAL FIELD

The technical field generally relates to the field of vehicles and, more specifically, to methods and systems for detecting and acting upon spills of beverages in a vehicle.

BACKGROUND

Many vehicles include cup holders for a driver and other passengers to place beverages while in the vehicle. Certain of these vehicles are autonomous vehicles, in which the vehicle is driven completely or in part (in various amounts) by an autonomous system rather than by a human driver. However, in certain circumstances in vehicles, including autonomous vehicles and other vehicles, a passenger's beverage may spill in the vehicle.

Accordingly, it is desirable to provide improved methods and systems for addressing beverage spills in vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided. The method includes the steps of detecting, via one or more sensors, that a beverage has spilled within a vehicle; providing information to a passenger of the vehicle, via instructions provided by a processor, as to an option to obtain a replacement beverage for the beverage that has spilled; receiving input from the passenger, in response to the information provided to the passenger, as to whether a replacement beverage is desired; and taking an action, via instructions executed by the processor, to obtain the replacement beverage, when the passenger has provided the input to obtain the replacement beverage.

Also in certain embodiments, the method includes ordering the replacement beverage from a location that is in proximity to the vehicle, via instructions provided by the processor, when the passenger has provided the input to obtain the replacement beverage.

Also in certain embodiments, the method includes automatically determining, via the processor, a modified route for the vehicle to take to first reach the location to obtain the replacement beverage, and then to reach a final destination for the vehicle.

Also in certain embodiments, the method includes automatically driving the vehicle along the modified route, via instructions provided by the processor.

Also in certain embodiments, the method includes providing a display of the modified route for a human driver to follow.

Also in certain embodiments, the method includes determining a type of the beverage that has spilled, via the processor, based on sensor data provided by the one or more sensors.

Also in certain embodiments, the method includes informing the passenger of the type of beverage that was spilled; and reordering the type of beverage that was spilled, via instructions provided by the processor, to obtain the replacement beverage of the same type that was spilled, when the passenger has provided the input to obtain the replacement beverage.

Also in certain embodiments, the method includes detecting, via a dampness sensor, that the beverage has spilled; and determining the type of beverage, via the processor, based at least in part on sensor data from one or more sensors selected from the group consisting of the following: a temperature sensor, an air quality sensor, and a camera.

Also in certain embodiments, the method includes detecting, via a dampness sensor, that the beverage has spilled; and determining the type of beverage, via the processor, based at least in part on a history of one or more beverage purchases of the passenger.

In accordance with another exemplary embodiment, a system is provided. The system includes one or more sensors and a processor. The one or more sensors are configured to detect that a beverage has spilled within a vehicle. The processor is coupled to the one or more sensors, and configured to at least facilitate: providing information to a passenger of the vehicle as to an option to obtain a replacement beverage; receiving input from the passenger, in response to the information provided to the passenger, as to whether a replacement beverage is desired; and taking an action to obtain the replacement beverage, when the passenger has provided the input to obtain the replacement beverage.

Also in certain embodiments, the processor is configured to at least facilitate ordering the replacement beverage from a location that is in proximity to the vehicle when the passenger has provided the input to obtain the replacement beverage.

Also in certain embodiments, the processor is configured to at least facilitate automatically determining a modified route for the vehicle to take to first reach the location to obtain the replacement beverage, and then to reach a final destination for the vehicle.

Also in certain embodiments, the processor is configured to at least facilitate automatically driving the vehicle along the modified route.

Also in certain embodiments, the system also includes a display device, and the processor is configured to at least facilitate providing a display of the modified route on the display device for a human driver to follow.

Also in certain embodiments, the processor is configured to at least facilitate determining a type of the beverage that has spilled, based on sensor data provided by the one or more sensors.

Also in certain embodiments, the system also includes a display device, and the processor is configured to at least facilitate providing instructions for the display device to inform the passenger of the type of beverage that was spilled; and reordering the type of beverage that was spilled, to obtain the replacement beverage of the same type that was spilled, when the passenger has provided the input to obtain the replacement beverage.

Also in certain embodiments, the one or more sensors include a dampness sensor and one or more additional sensors. The dampness sensor is configured to detect that the beverage has spilled. The one or more additional sensors are selected from the group consisting of the following: a temperature sensor, an air quality sensor, and a camera, that are configured to provide sensor data for the processor for determining the type of beverage that has spilled.

Also in certain embodiments, the one or more sensors include a dampness sensor that is configured to detect that the beverage has spilled; the system further includes a memory configured to store a history of one or more beverage purchases of the passenger; and the processor is configured to at least facilitate determining the type of the beverage using the history of the one or more beverage purchases of the passenger.

In a further exemplary embodiment, a vehicle is provided. The vehicle includes one or more sensors, an input device, and a processor. The one or more sensors are configured to detect that a beverage has spilled within a vehicle. The input device configured to receive an input from a passenger of the vehicle. The processor is coupled to the one or more sensors and to the input device, and configured to at least facilitate: providing information to a passenger of the vehicle as to an option to obtain a replacement beverage; receiving input from the passenger via the input device, in response to the information provided to the passenger, as to whether a replacement beverage is desired; and taking an action to obtain the replacement beverage, when the passenger has provided the input to obtain the replacement beverage.

Also in certain embodiments, the processor is configured to at least facilitate ordering the replacement beverage from a location that is in proximity to the vehicle when the passenger has provided the input to obtain the replacement beverage.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
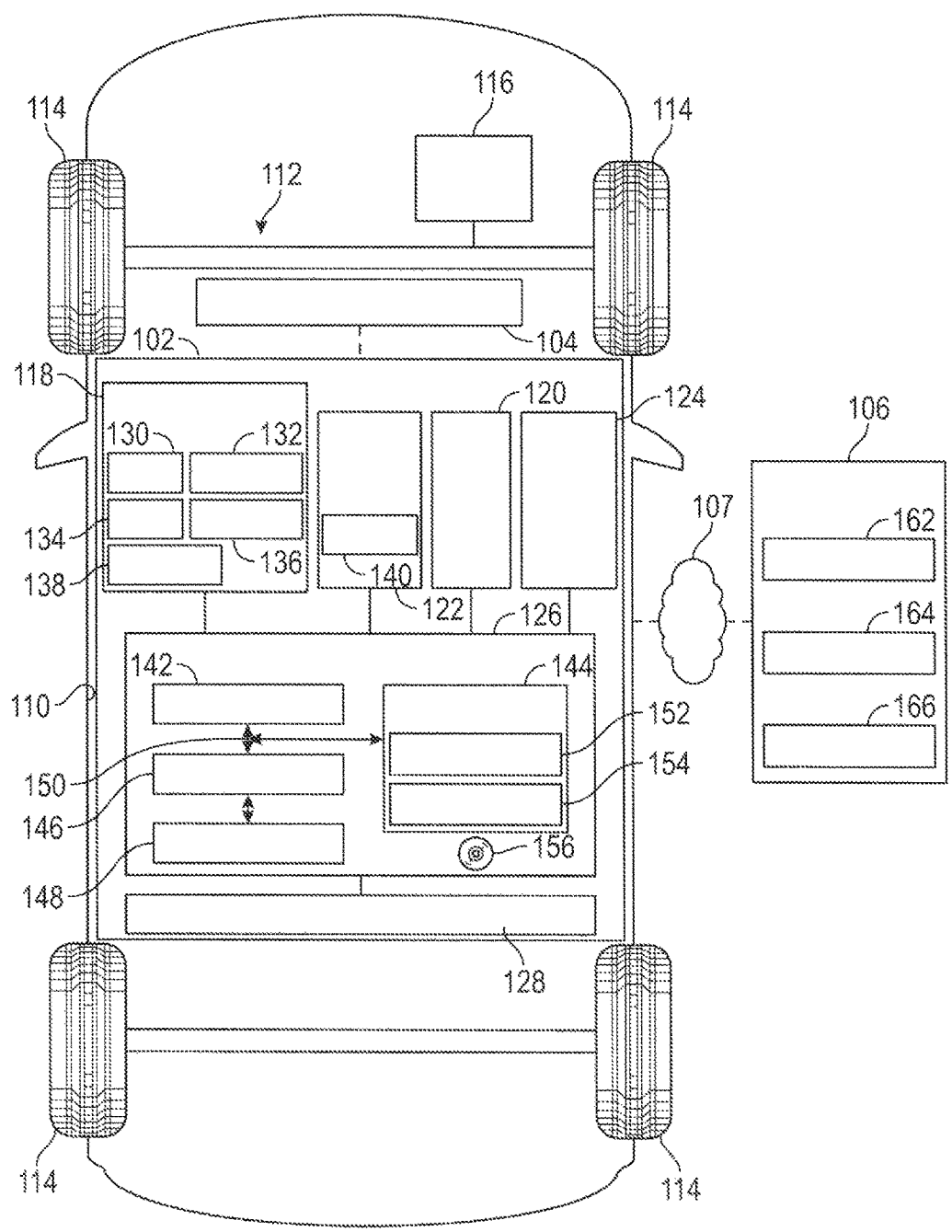
FIG. 1 is a functional block diagram of a vehicle that includes a control system for addressing beverage spills in the vehicle, and depicted along with a remote server, in accordance with an exemplary embodiment.

FIG. 1 illustrates a vehicle 100, according to an exemplary embodiment. As described in greater detail further below, the vehicle 100 includes a control system 102 for addressing beverage spills in the vehicle 100, in accordance with the steps of the process 200 described further below in connection with FIGS. 2 and 3, in accordance with exemplary embodiments.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 100 is a land vehicle configured to operate on roadways. In certain embodiments, the vehicle 100 may also comprise a motorcycle or other vehicle.

In certain embodiments, the vehicle 100 comprises an autonomous vehicle. In certain embodiments, the vehicle 100 comprises a fully autonomous vehicle, in which all of the driving is performed via a computer system (such as the control system 102, the drive system 116, and/or one or more other systems that include a processor) rather than a human driver. In certain other embodiments, the vehicle 100 comprises a semi-autonomous vehicle, in some of the driving is performed via a computer system (such as the control system 102, the drive system 116, and/or one or more other systems that include a processor), and some of the driving is performed by a human driver. In yet other embodiments, the vehicle 100 comprises a standard, non-autonomous vehicle, in which the driving is performed by the human driver.

The vehicle 100 includes a body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a fuel cell, a combustion/electric motor hybrid engine, and an electric motor.

The control system 102 addresses beverage spills in the vehicle 100. In various embodiments, the control system 102 senses a beverage spill within the vehicle 100, makes a determination as to the type of beverage that has been spilled, and takes appropriate action in view of the beverage spill, such as providing passengers with the opportunity to order a new beverage and for an adjusted route of the vehicle 100 to a location that offers the beverage. In certain embodiments, the control system 102 interacts with a portable electronic device 104 (e.g., a smart phone, a portable DVD or movie player, an MP3 player, and/or another type of portable electronic device) of one or more of the passengers and/or a remote server 106 in providing these functions. In addition, in various embodiments, the control system 102 provides these functions are other functionality in accordance with the steps of the process 200 described further below in connection with FIGS. 2 and 3.

As depicted in FIG. 1, the control system 102 includes a sensor array 118, a transceiver 120, an input device 122, a navigation system 124, a controller 126, and a display 128. It will be appreciated that in certain embodiments the control system 102 may include one or more other components, and/or that one or more components depicted in FIG. 1 as being part of the control system 102 may be part of and/or coupled to the portable electronic device 104 and/or the drive system 116 and/or one or more other vehicle components, and/or the remote server 106 and/or one or more other devices and/or system.

In certain embodiments, the sensor array 118 includes various sensors that are utilized to detect an analyze a beverage spill within the vehicle 100. In various embodiments, the sensor array 118 may include one or more temperature sensors 130, dampness sensors 132, air quality sensors 134, cameras 136, and/or other sensors 138

In certain embodiments, the transceiver 120 receives transmissions from, and/or provides transmissions to, the portable electronic device 104 and/or the remote server 106. In certain embodiments, the transmissions pertain to information as to a beverage of the passenger, a detection of a spill of the beverage, and options and instructions for reordering the beverage after a spill, among other possible information.

Also in certain embodiments, the input device 122 receives inputs from one or more passengers of the vehicle 100. In various embodiments, the input device 122 may comprise any number of different types of devices such as, by way of example only, a touch screen, one or more buttons or knows, a joystick, a microphone, and so on, engaged by the passenger. Also in various embodiments, the input device 122 includes an associated sensor 140 for receiving passenger inputs. In various embodiments, the passenger inputs include selections pertaining to a beverage of the passenger, and the passenger's desire to reorder the beverage and/or for the vehicle 100 to take a modified route to obtain the beverage, among other possible information, such as a desired geographic destination for the current vehicle drive. In certain embodiments these inputs may be provided via a separate input device, such as of the navigation system 124 and/or the portable electronic device 104.

The navigation system 124 obtains location information pertaining to the vehicle 100. In various embodiments, the navigation system 124 includes and/or is coupled to one or more antennas of the vehicle 100 that receive location information from one or more satellite based systems, such as a global positioning system (GPS) system. Also in certain embodiments, the navigation system 124 may comprise the input device 122 and/or components thereof for receiving passenger inputs (e.g., as to a preferred destination for the current vehicle drive) and/or may have its own input device.

The controller 126 controls operation of the control system 102, and takes control measures when a beverage spill occurs in the vehicle 100. In various embodiments, the controller 126 helps to determine that a beverage spill has occurred, and to identify the type of beverage that has been spilled, based on the data provided by the sensor array 118. In addition, also in various embodiments, the controller 126 provides the passenger with options to reorder the beverage and/or to adjust the route of the vehicle 100 to obtain the beverage (e.g., via information provided to the passenger via the display 128, which may also include, in certain embodiments, a calculated incremental additional time to procure a replacement beverage via the modified route), among other functionality. In one embodiment, the controller 126 is coupled to the sensor array 118, the transceiver 120, the input device 122, the navigation system 124, and the display 128. In certain embodiments, the controller 126 is also coupled to the portable electronic device 104 and/or the remote server 106. Also in one embodiment, the controller 126 is disposed within the control system 102, within the vehicle 100. In addition, in certain embodiments, the controller 126 and/or certain components thereof can be placed in the portable electronic device 104, and/or outside vehicle, such as in the remote server 106, or in the cloud or on a remote smart device, and so on.

As depicted in FIG. 1, the controller 126 comprises a computer system. In certain embodiments, the controller 126 may also include the sensor array 118, the transceiver 120, the input device 122, the navigation system 124, the portable electronic device 104, the remote server 106, and/or other devices and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 200 described further below in connection with FIGS. 2 and 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154 (e.g., map databases, locations that sell beverages, passenger preferences, a beverage purchasing history for the passengers, and so on).

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described further below in connection with FIGS. 2 and 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

In various embodiments, the display 128 provides information for the driver and/or other passengers in the vehicle 100, such as a route of travel for the vehicle 100, options to reorder beverages, an updated route for the vehicle 100, a calculated incremental additional time to procure a replacement beverage via the modified route, and so on. In certain embodiments, the display 128 includes a built-in screen (e.g., a light emitting diode, or "LED" screen) within the vehicle 100. In certain embodiments, the display 128 also includes speakers and/or other audio components. In addition, also in certain embodiments, the display 128 may also include an interface and/or input device for the passenger to provide content-related inputs (e.g., including the input device 122 and/or a separate input device and/or one or more components thereof). Also in certain embodiments, the display 128 may also include a display (e.g., a display screen and/or speakers) of the portable electronic device 104.

In various embodiments, the portable electronic device 104 provides information and/or other assistance for the control system 102 for providing to and/or receiving information from the passengers, such as a desired destination of travel, beverage reorder options and requests, updated travel routes, a calculated incremental additional time to procure a replacement beverage via modified routes, and so on. In certain embodiments, the portable electronic device 104 comprises a smart phone and/or another type of portable electronic device of the passenger of the vehicle 100. In certain embodiments, the passenger may bring the portable electronic device 104 into the vehicle 100. In other embodiments, the portable electronic device 104 may be part of the vehicle 100. In certain embodiments, the portable electronic device 104 comprises a smart phone, and the control system 102 (e.g., including the programs 152 thereof) comprise an application (or "app") for the smart phone. However, this may vary in other embodiments.

In addition, in various embodiments the control system 102 communicates with the portable electronic device 104 via one or more communication links 105. In one embodiment, the communication link 105 comprises a wired connection (e.g., in which the portable electronic device 104 may be plugged into the vehicle 100, and the control system 102 thereof). In certain other embodiments, the communication link 105 comprises one or more wireless connections, such as one or more cellular and/or short range wireless connections.

In certain embodiments, the remote server 106 provides information and/or other assistance for providing appropriate actions when a beverage spills in the vehicle 100, such as detecting the spill, identifying the spill, providing beverage reorder options, providing route adjustment options in view of the beverage spill, identifying passenger history (e.g., regarding beverage history), providing a calculated incremental additional time to procure a replacement beverage via the modified route, and obtaining passenger inputs (e.g., as to options to reorder a beverage, adjust the route of the vehicle 100, and so on).

In the depicted embodiment, the remote server 106 includes a processor 162, a transceiver 164, and a memory 166. In various embodiments, the processor 162 controls operation of the remote server 106, including communicating with and providing content and/or content lists for the control system 102 of the vehicle 100. Also in various embodiments, the transceiver communicates with the control system 102 with a wireless network 107 (e.g., a cellular, satellite, and/or other wireless network, for communicating with the transceiver 120 of the control system 102). In addition, in various embodiments, the memory 166 includes stored information such as map information (e.g., pertaining to locations that sell beverages and passenger preferences, such as a beverage purchasing history for the passengers).

Figure 2:
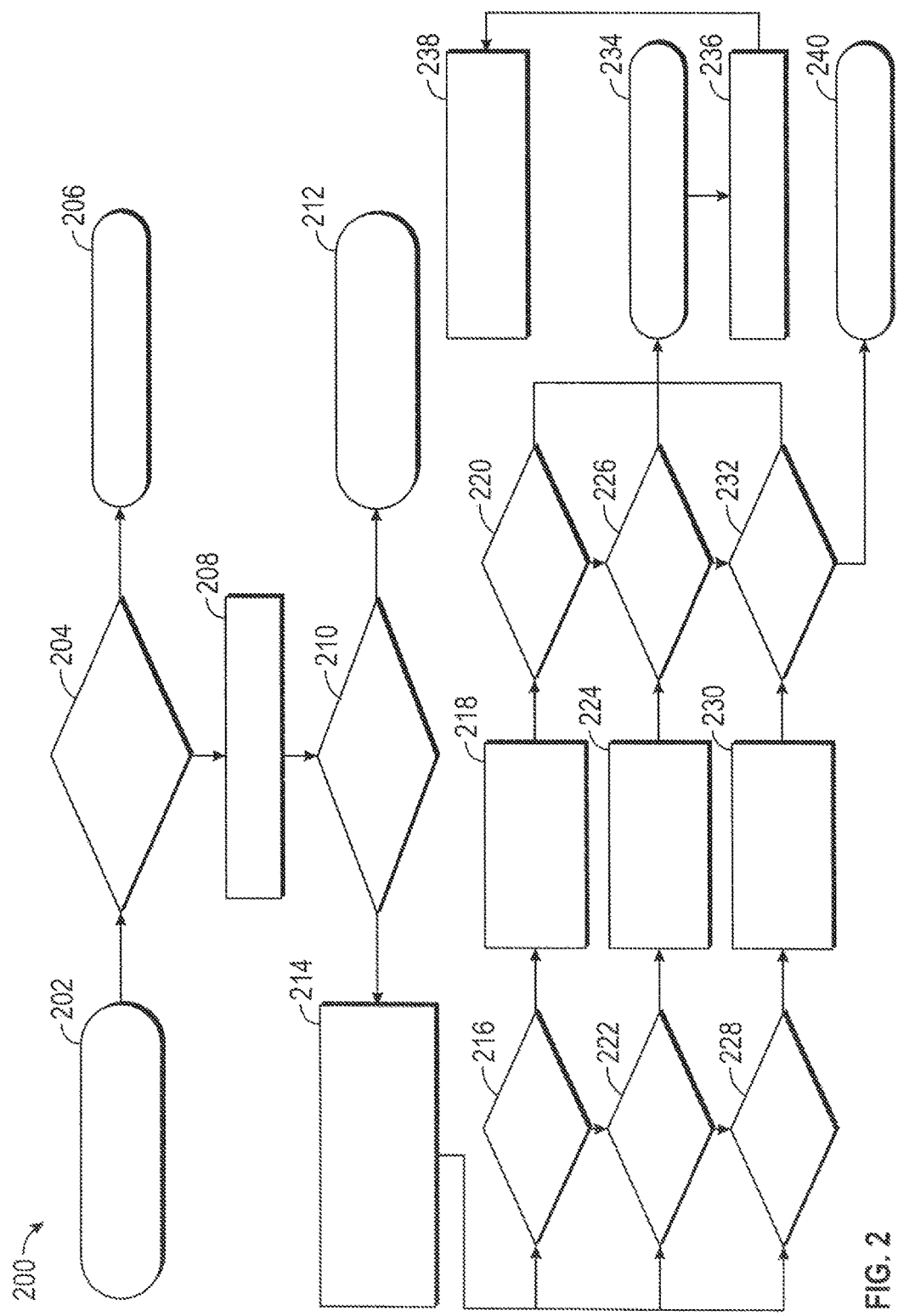
FIG. 2 is a flowchart of a process for addressing beverage spills in a vehicle, and that can be implemented in connection with the vehicle and the control system, the portable electronic device, and the remote server of FIG. 1, in accordance with an exemplary embodiment.

FIG. 2 is a flowchart of a process 200 for taking actions when a beverage spill occurs inside a vehicle, in accordance with an exemplary embodiment. In various embodiments, the process 200 can be implemented in connection with the vehicle 100, the control system 102, the portable electronic device 104, and the remote server 106 of FIG. 1, in accordance with an exemplary embodiment.

As depicted in FIG. 2, the process begins at step 202. In various embodiments, step 202 occurs when a beverage spill occurs inside the vehicle, or when an event has occurred that may relate to a beverage spill (e.g., when a cup or other object falls, or a passenger takes an action to catch a cup or other object, or the like, in certain embodiments). In various embodiments, one or more beverages of a passenger of the vehicle 100 (e.g., a driver or one or more other passengers) spills.

A determination is made as to liquid has contacted one or more sensed areas of the vehicle (step 204). In various embodiments, the processor 142 of FIG. 1 determines whether one or more sensors of the sensors of the sensor array 118 of FIG. 1 (e.g., the dampness sensor 132) has sensed that liquid has contacted the one or more sensed areas of the vehicle 100. In certain embodiments, the sensed areas comprise one or more areas in proximity to one or more sensors of the sensor array 118 (such as the dampness sensor 132), for example that may be disposed proximate vehicle cup holders, vehicle passenger seats, instrument panels (near the top of instrument panels), flooring, footwells, and/or one or more other locations inside the vehicle 100. In certain embodiments, the determinations may be provided by the sensor(s) themselves.

If it is determined that liquid has not contacted one or more sensed areas, then no automated response is provided (step 206). In various embodiments, no corrective action is taken, and the vehicle 100 continues to be operated as normal.

Conversely, if it is determined that liquid has contacted one or more sensed areas, then the sensors are activated (step 208). In various embodiments, various sensors of the sensor array 118 of FIG. 1 (e.g., the temperature sensor 130, the air quality sensor 134, the camera 136, and/or one or more other sensors 138) are active by the processor 142 of FIG. 1 for analysis of the type of liquid that has spilled.

A determination is made as to whether the liquid has been successfully identified (step 210). In various embodiments, one or more sensors of the sensor array 118 of FIG. 1 (e.g., the temperature sensor 130, the air quality sensor 134, the camera 136, and/or one or more other sensors 138) provide sensed values pertaining to the liquid based on one or more characteristics such as temperature, odor, color, product packaging, product label, and/or other visual features and/or other sensed features), and the processor 142 determines whether a successful identification is made as to the type of liquid (and, if so, a determination as to the type of liquid itself). In certain embodiments, the determination of the type of liquid may also be identified using a history of the passengers, such as a beverage purchase history for the passengers, for example as stored in the memory 144 in the vehicle 100 as stored values 154 therein and/or as stored in the portable electronic device 104 of the passenger and/or the memory 166 of the remote server 106. In certain histories, a most recent beverage as to a beverage most recently purchased (e.g., soon before the passenger enters the vehicle 100) is utilized in determining the type of liquid. In other embodiments, an average or aggregate beverage history may be utilized (e.g., as to specific type(s) of beverages that the passenger typically purchases, or the like). In yet other embodiments, the process 142 may provide instructions for an inquiry to be provided to the passenger as to the type of beverage, with the passenger then responding (e.g., via the input device 122 of FIG. 1).

If it is determined that the liquid has not been successfully identified, then a general spill alert is provided (step 212). In certain embodiments, an audio and/or visual notification is provided for the passenger (e.g., via the display 128 and/or the portable electronic device 104 of FIG. 1) via instructions provided by the processor 142, that a beverage spill has occurred, without an identification of the type of beverage. Also in certain embodiments, a similar notification may be provided to the remote server 106 of FIG. 1 via the transceiver 120 of FIG. 1.

Conversely, if it is determined that the liquid has been successfully identified, then information is provided to the passengers in the vehicle regarding beverage reorder options (step 214). In various embodiments, the information includes the identification of the type of beverage that has spilled, along with a request as to whether the passenger wishes to order a replacement beverage of the same type. In certain embodiments, the information may also include an identification of a nearby location (e.g., restaurant, convenience store, gas station, truck stuck, rest stop, or the like) that sells that type of beverage (in some embodiments, including a geographic location of the location and/or placement on a map). In certain embodiments, this information is provided via an audio and/or visual manner for the passenger, for example on the display 128 and/or the portable electronic device 104 of FIG. 1, via instructions provided by the processor 142.

For example, in one embodiment, a determination is made as to whether the identified liquid is water (step 216). In one embodiment, this determination is made by the processor 142 of FIG. 1 based on information provided by the sensors of the sensor array 118 of FIG. 1. If it is determined that the identified liquid is water, then an invitation is provided to the passenger with the option to order another water (step 218). In various embodiments, the invitation is provided along with a specific image (e.g., photograph) of a replacement water product during step 218 on the display 128 and/or portable electronic device 104 of FIG. 1 in accordance with instructions provided by the processor. A determination is then made as to whether the passenger has decided to order the replacement water (step 220). In various embodiments, the determination of step 220 is made by the processor 142 of FIG. 1 based on information obtained via the input device sensor 140 of FIG. 1 that monitors the passengers' engagement of the input device 122 of FIG. 1 in making the passengers' selection. The process then proceeds to step 234, discussed further below.

By way of further example, if the liquid is not determined to be water, a determination is made as to whether the identified liquid is coffee (step 222). In one embodiment, this determination is made by the processor 142 of FIG. 1 based on information provided by the sensors of the sensor array 118 of FIG. 1. If it is determined that the identified liquid is coffee, then an invitation is provided to the passenger with the option to order another coffee (step 224). In various embodiments, the invitation is provided along with a specific image (e.g., photograph) of a replacement coffee product during step 224 on the display 128 and/or portable electronic device 104 of FIG. 1 in accordance with instructions provided by the processor. A determination is then made as to whether the passenger has decided to order the replacement coffee (step 226). In various embodiments, the determination of step 226 is made by the processor 142 of FIG. 1 based on information obtained via the input device sensor 140 of FIG. 1 that monitors the passengers' engagement of the input device 122 of FIG. 1 in making the passengers' selection. The process then proceeds to step 234, discussed further below.

By way of an additional further example, if the liquid is not determined to be coffee, a determination is made as to whether the identified liquid is one or more other beverages (e.g., a soft drink) (step 228). In one embodiment, this determination is made by the processor 142 of FIG. 1 based on information provided by the sensors of the sensor array 118 of FIG. 1. In certain embodiments, the type of beverage may be identified further with respect to sub-categories of the identified beverage category (e.g., cherry soda, orange soda, root beer, diet soda, and the like), based on information obtained by the sensors of the sensor array 118. If it is determined that the identified liquid is one or more other types of beverages (e.g., a soft drink, or type of soft drink), then an invitation is provided to the passenger with the option to order another beverage of the same type (e.g., another soft drink) (step 230). In various embodiments, the invitation is provided along with a specific image (e.g., photograph) of a replacement product of the same type that has spilled (e.g., another soft drink) during step 230 on the display 128 and/or portable electronic device 104 of FIG. 1 in accordance with instructions provided by the processor. A determination is then made as to whether the passenger has decided to order the replacement beverage (e.g., soft drink)

(step 232). In various embodiments, the determination of step 232 is made by the processor 142 of FIG. 1 based on information obtained via the input device sensor 140 of FIG. 1 that monitors the passengers' engagement of the input device 122 of FIG. 1 in making the passengers' selection. The process then proceeds to step 234, discussed below.

If the passenger has provided an input to order the replacement beverage in any of steps 220, 226, or 232, then, during step 234, a beverage reorder is made. In certain embodiments, the processor 142 of FIG. 1 provides instructions for reordering the specific type of beverage that has been spilled, in accordance with the passenger's request, in accordance with the determinations of steps 208-232. In certain embodiments, the processor 142 provides instructions for ordering the replacement beverage online, and/or via the transceiver 120 of FIG. 1, and/or via the portable electronic device 104 and/or the remote server 106 of FIG. 1.

In addition, in certain embodiments, a modified route is determined (step 236). In various embodiments, the processor 142 of FIG. 1 selects a modified route for the vehicle 100 to travel from its present location to the location from which the beverage replacement has been reordered, for example using map data stored in the stored values 154 of the memory 144 of FIG. 1, and/or as stored in the navigation system 124, the portable electronic device 104, and/or the memory 166 of the remote server 106 of FIG. 1. Also in certain embodiments, the modified route is displayed for the passengers of the vehicle 100, for example on the display 128, the navigation system 124, and/or the portable electronic device 104 of FIG. 1, in accordance with instructions provided by the processor 142 of FIG. 1. In addition, in certain embodiments, a calculation is made (e.g., by the processor 142) as to an incremental additional time to procure a replacement beverage via the modified route, and the calculated incremental additional time is provided for the passengers of the vehicle 100, for example on the display 128, the navigation system 124, and/or the portable electronic device 104 of FIG. 1, in accordance with instructions provided by the processor 142 of FIG. 1, for example in order to assist the passenger in making a decision as to whether to order the replacement beverage.

In addition, in various embodiments, the modified route is implemented (step 238). In certain embodiments, during step 238, the modified route of step 236 is implemented, automatically, via the processor 142 of FIG. 1 (and/or via one or more other processors and/or control systems) for autonomous driving of the vehicle 100 to the location. In certain other embodiments, instructions are provided for the human driver (e.g., via the display 128, the navigation system 124, and/or the portable electronic device 104) for the human driver to drive the vehicle 100 to the location to obtain the replacement beverage.

It will be appreciated that the processor-based action(s) may vary in certain embodiments. For example, in certain embodiments, the route may be automatically modified in step 236, and then implemented in step 238 either automatically by the vehicle 100, or by a driver following the modified route, without the beverage being reordered in step 234, in certain embodiments. For example, in one such embodiment, the passenger may then enter the location and then order the beverage himself or herself when the vehicle 100 reaches the location, and so on. By way of another example, in certain embodiments, the vehicle 100 may order the beverage in step 234 without modifying the route in steps 236 and 238. For example, in various embodiments, the replacement beverage may be delivered to the destination of the current route when the vehicle 100 reaches the destination, and/or the replacement beverage may be available on a walking route between the vehicle and the passenger's final destination or next transmit mode, and so on, among other possible variations.

With reference back to steps 220, 226, and 236, conversely, if the passenger has declined to reorder the beverage, then the process instead proceeds to step 240. During step 240, no automated response is provided. In various embodiments, no corrective action is taken, and the vehicle 100 continues to be operated as normal.

Figure 3:
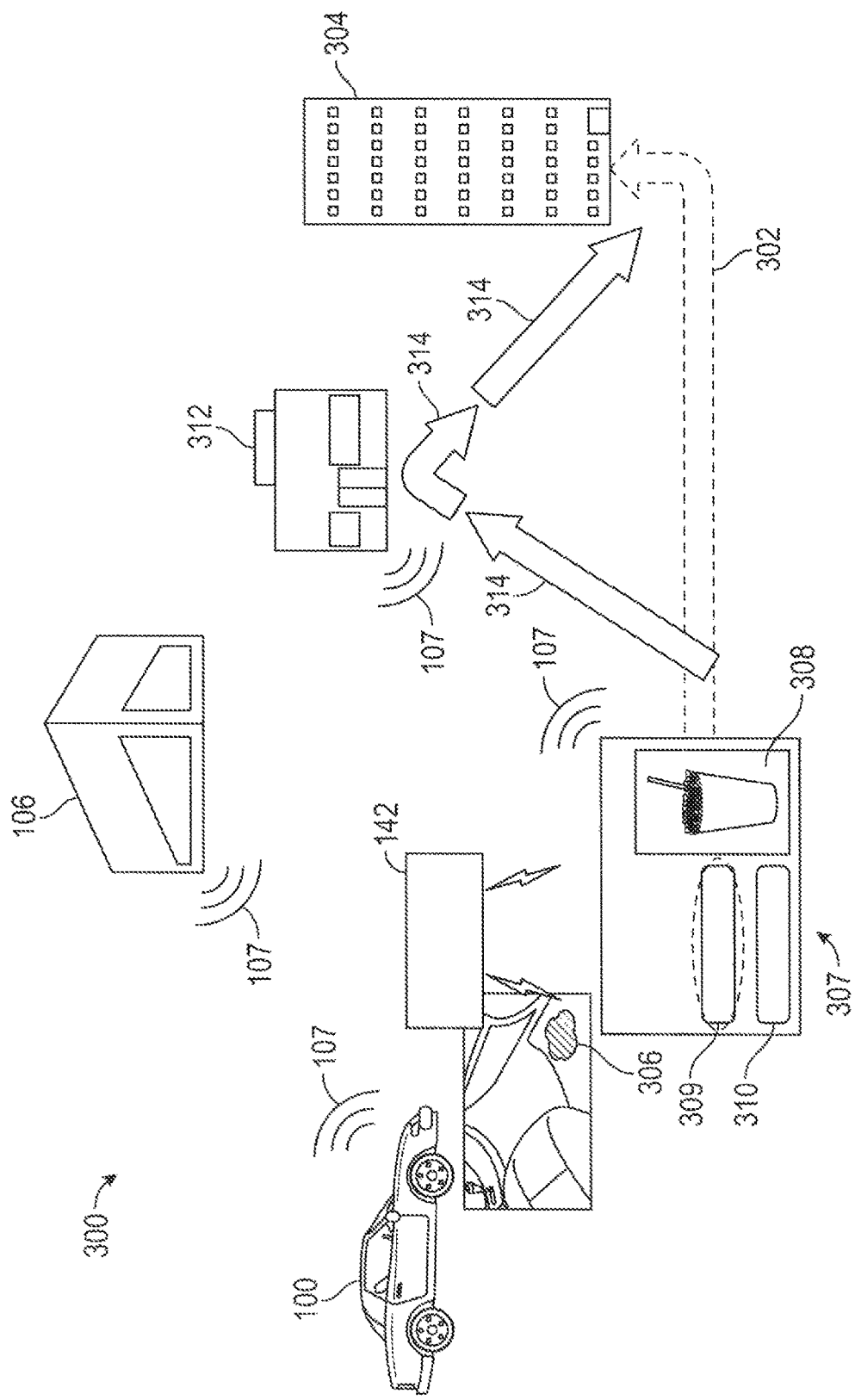
FIG. 3 provides a diagram showing an exemplary implementation of the process of FIG. 2, in connection with the vehicle, the control system, and the remote server of FIG. 1, in accordance with an exemplary embodiment.

Turning now to FIG. 3, a diagram is provided that shows an exemplary implementation 300 of the process 200 of FIG. 2, in connection with the vehicle 100, the control system 102, and the remote server 106 of FIG. 1, in accordance with an exemplary embodiment.

As depicted in FIG. 3, in one embodiment, the vehicle 100 is travelling along an original route 302 to a destination 304. A beverage is spilled inside the vehicle 100, and liquid contacts a sensed area 306 within the vehicle 100. The onboard processor 142 determines that a spill has occurred, and in various embodiments determines the type of liquid that has been spilled, based on data provided by the sensors of the sensor array 118 of FIG. 1 (and/or, in certain embodiments, also using data stored in memory, such as the memory 144 of FIG. 1, such as a passenger beverage history, and/or via inputs made by the passenger via the input device 122 of FIG. 1 and sensed by the input device sensor 140 of FIG. 1, and/or via a beverage order history and/or other information obtained via the remote server 106 via wireless network 107).

Also in various embodiments, the processor 142 provides instructions for a display 307 to be provided (e.g., by the display 128 of FIG. 1) for the passenger within the vehicle 100. In the example of FIG. 3, the display 307 includes a picture 308 (e.g., a photograph) of the type of beverage that was spilled (in certain embodiments, also including a flavor, brand, or the like), along with reordering options 309, 310. For example, in one embodiment, the passenger is provided with a first option 309 to "Order" the beverage, and a second option to decline the offer (e.g., "No Thanks").

If the passenger has selected the "Order" option 309, then the beverage is reordered. Specifically, in one embodiment, the processor 142 provides instructions to reorder the same type of beverage that was spilled, from a location 312 that sells that particular type of beverage. In one embodiment, the processor 142 provides instructions for the transceiver 120 of the vehicle 100 of FIG. 1 to order the beverage from the location 312 via the wireless network 107.

Also in one embodiment, the processor 142 determines and implements a modified route 314 for the vehicle 100 to travel. The vehicle 100 then travels along the modified route 314 to the location 312 and then, ultimately, to the destination 304. In certain embodiments, the processor 142 and/or one or more processors and/or automated systems may drive the vehicle 100 along the modified route 314 in an autonomous manner, with little or no driving or input required from a human driver. In certain other embodiments, the processor 142 provides instructions for the display of the modified route 314 within the vehicle 100 (e.g., via the display 128 and/or the navigation system 124 of FIG. 1) for the human driver to follow. In either case, the passenger (e.g., a driver or other passenger) can obtain the replacement beverage at the location 312 (e.g. through a drive through window and/or by entering the location, and so on).

Accordingly, the systems, vehicles, and methods described herein provide for action upon a beverage a spill in a vehicle. In various embodiments, the systems, vehicles, and methods detect the beverage spill, identify the type of beverage that has been spilled, provide the passenger with options to reorder the beverage, receive passenger inputs to reorder the beverage, reorder the beverage from a nearby beverage location, and modify the route of the vehicle to obtain the replacement beverage from the location. It will be appreciated that the systems, vehicles, and methods described herein may be provided for autonomous vehicles, semi-autonomous vehicles, and non-autonomous (e.g., human driven) vehicles, in various different embodiments.

It will be appreciated that the systems, vehicles, and methods may vary from those depicted in the Figures and described herein. For example, the vehicle 100, the control system 102, the portable electronic device 104, the remote server 106, and/or various components thereof may vary from that depicted in FIG. 1 and described in connection therewith, in various embodiments. It will similarly be appreciated that the steps of the process 200 may differ from those depicted in FIGS. 2 and 3, and/or that various steps of the process 200 may occur concurrently and/or in a different order than that depicted in FIGS. 2 and 3, in various embodiments. It will similarly be appreciated that the implementation 300 of FIG. 3 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   detecting, via one or more sensors, that a beverage has spilled within a vehicle;
   providing information to a passenger of the vehicle, via instructions provided by a processor, as to an option to obtain a replacement beverage for the beverage that has spilled;
   receiving an input from the passenger, in response to the information provided to the passenger, as to whether a replacement beverage is desired; and
   taking an action, via instructions executed by the processor, to obtain the replacement beverage, when the passenger has provided the input to obtain the replacement beverage.

2. The method of claim 1, wherein the step of taking the action comprises:
   ordering the replacement beverage from a location that is in proximity to the vehicle, via instructions executed by the processor, when the passenger has provided the input to obtain the replacement beverage.

3. The method of claim 2, further comprising:
   automatically determining, via the processor, a modified route for the vehicle to take to first reach the location to obtain the replacement beverage, and then to reach a final destination for the vehicle.

4. The method of claim 3, further comprising:
   automatically driving the vehicle along the modified route, via instructions provided by the processor.

5. The method of claim 3, further comprising:
   providing a display of the modified route for a human driver to follow.

6. The method of claim 1, further comprising:
   determining a type of the beverage that has spilled, via the processor, based on sensor data provided by the one or more sensors.

7. The method of claim 6, wherein:
   the step of providing the information further comprises informing the passenger of the type of beverage that was spilled; and
   the step of taking the action comprises reordering the type of beverage that was spilled, via instructions provided by the processor, to obtain the replacement beverage of the same type that was spilled, when the passenger has provided the input to obtain the replacement beverage.

8. The method of claim 6, wherein:
   the step of detecting that the beverage has spilled comprises:
      detecting, via a dampness sensor, that the beverage has spilled; and
   the step of determining the type of beverage comprises:
      determining the type of beverage, via the processor, based at least in part on sensor data from one or more sensors selected from the group consisting of the following: a temperature sensor, an air quality sensor, and a camera.

9. The method of claim 6, wherein:
   the step of detecting that the beverage has spilled comprises:
      detecting, via a dampness sensor, that the beverage has spilled; and
   the step of determining the type of beverage comprises:
      determining the type of beverage, via the processor, based at least in part on a history of one or more beverage purchases of the passenger.

10. A system comprising:
    one or more sensors configured to detect that a beverage has spilled within a vehicle; and
    a processor coupled to the one or more sensors and configured to at least facilitate:
       providing information to a passenger of the vehicle as to an option to obtain a replacement beverage;
       receiving input from the passenger, in response to the information provided to the passenger, as to whether a replacement beverage is desired; and
       taking an action to obtain the replacement beverage, when the passenger has provided the input to obtain the replacement beverage.

11. The system of claim 10, wherein the processor is configured to at least facilitate:
    ordering the replacement beverage from a location that is in proximity to the vehicle when the passenger has provided the input to obtain the replacement beverage.

12. The system of claim 11, wherein the processor is configured to at least facilitate:
    automatically determining a modified route for the vehicle to take to first reach the location to obtain the replacement beverage, and then to reach a final destination for the vehicle.

13. The system of claim 12, wherein the processor is configured to at least facilitate:
    automatically driving the vehicle along the modified route.

14. The system of claim 12, further comprising:
a display device;
wherein the processor is configured to at least facilitate providing a display of the modified route on the display device for a human driver to follow.

15. The system of claim 10, wherein the processor is configured to at least facilitate:
determining a type of the beverage that has spilled, based on sensor data provided by the one or more sensors.

16. The system of claim 15, further comprising:
a display device;
wherein the processor is configured to at least facilitate:
providing instructions for the display device to inform the passenger of the type of beverage that was spilled; and
reordering the type of beverage that was spilled, to obtain the replacement beverage of the same type that was spilled, when the passenger has provided the input to obtain the replacement beverage.

17. The system of claim 15, wherein the one or more sensor include:
a dampness sensor that is configured to detect that the beverage has spilled; and
one or more additional sensors selected from the group consisting of the following: a temperature sensor, an air quality sensor, and a camera, that are configured to provide sensor data for the processor for determining the type of beverage that has spilled.

18. The system of claim 15, wherein:
the one or more sensor include a dampness sensor that is configured to detect that the beverage has spilled;
the system further includes a memory configured to store a history of one or more beverage purchases of the passenger; and
the processor is configured to at least facilitate determining the type of the beverage using the history of the one or more beverage purchases of the passenger.

19. A vehicle comprising:
one or more sensors configured to detect that a beverage has spilled within a vehicle;
an input device configured to receipt an input from a passenger of the vehicle; and
a processor coupled to the one or more sensors and to the input device and configured to at least facilitate:
providing information to a passenger of the vehicle as to an option to obtain a replacement beverage;
receiving input from the passenger via the input device, in response to the information provided to the passenger, as to whether a replacement beverage is desired; and
taking an action to obtain the replacement beverage, when the passenger has provided the input to obtain the replacement beverage.

20. The vehicle of claim 19, wherein the processor is configured to at least facilitate:
ordering the replacement beverage from a location that is in proximity to the vehicle when the passenger has provided the input to obtain the replacement beverage.

\* \* \* \* \*